United States Patent [19]
Lee

[11] 4,047,236
[45] Sept. 6, 1977

[54] SUPERSENSITIVE MAGNETORESISTIVE SENSOR FOR HIGH DENSITY MAGNETIC READ HEAD

[75] Inventor: Fred S. Lee, Oklahoma City, Okla.

[73] Assignee: Honeywell Information Systems Inc., Waltham, Mass.

[21] Appl. No.: 576,162

[22] Filed: May 9, 1975

[51] Int. Cl.² .............................................. G11B 5/22
[52] U.S. Cl. ................................. 360/113; 338/32 R
[58] Field of Search ............... 360/113, 122, 123, 125; 338/32 R; 324/46; 340/174 EB

[56] References Cited

U.S. PATENT DOCUMENTS

| | | | |
|---|---|---|---|
| 3,260,980 | 7/1966 | Weiss | 360/113 |
| 3,487,388 | 12/1969 | Camp | 360/111 |
| 3,700,827 | 10/1972 | Nagao | 360/122 |
| 3,731,007 | 5/1973 | Masuda et al. | 360/113 |
| 3,928,836 | 12/1975 | Makino | 324/46 |

*Primary Examiner*—Alfred H. Eddleman
*Attorney, Agent, or Firm*—John S. Solakian; Ronald T. Reiling; Nicholas Prasinos

[57] ABSTRACT

A high density magnetic read head is designed to yield an increased read signal. The width of the read head is reduced by folding a magnetoresistive sensor strip into U-shaped loops. The loops are folded one upon another in a plane perpendicular to the plane of the storage medium. By folding the sensor strip, the shape anisotropy of the sensor is increased and the single domain condition of the sensor in the desired direction is maintained.

1 Claim, 4 Drawing Figures

U.S. Patent
Sept. 6, 1977
4,047,236
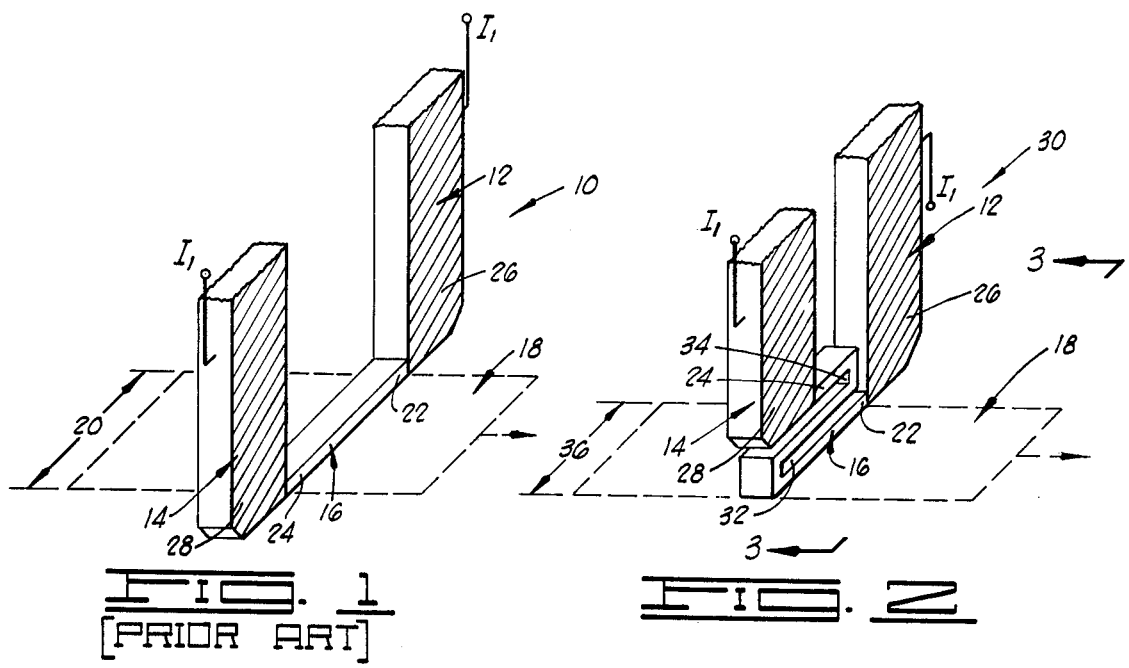
FIG. 1 [PRIOR ART]
FIG. 2
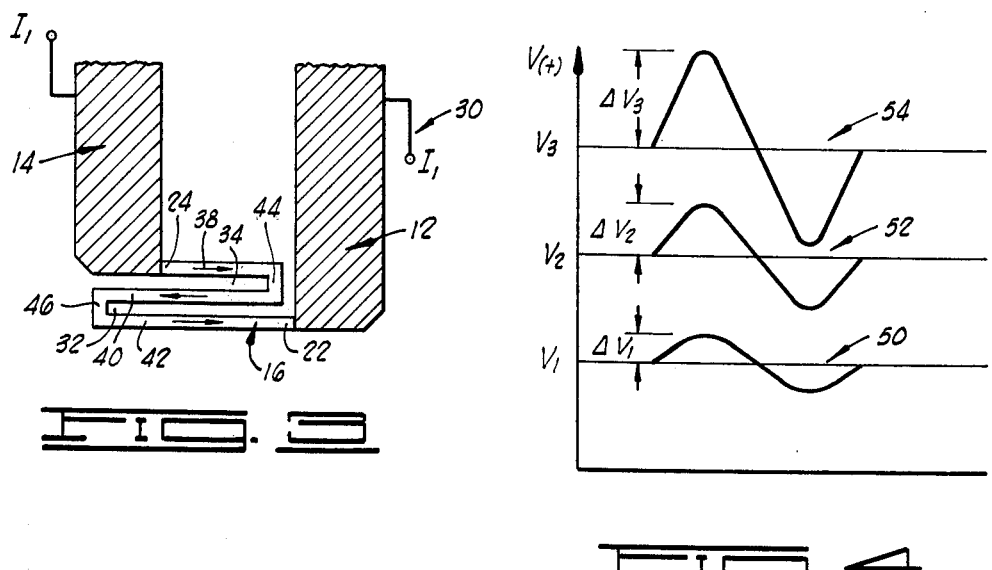
FIG. 3
FIG. 4

SUPERSENSITIVE MAGNETORESISTIVE SENSOR FOR HIGH DENSITY MAGNETIC READ HEAD

BACKGROUND OF THE INVENTION

This invention relates generally to thin film magnetic read heads and more particularly, but not by way of limitation, to a supersensitive magnetoresistive sensor.

Prior art magnetic read heads contain a first and second conductor with a magnetoresistive sensor strip connected to the ends of the conductors for reading bits of information stored on a storage medium. To increase the density of the recording tracks on the storage medium, the width of both the write head used to record the information and the read head must be reduced. A magnetoresistive sensor's ability to read recorded information is greatly reduced if the ratio of the width to the height of the sensor approaches unity. Should this ratio approach unity the shape anisotropy of the sensor is decreased thereby causing an instability of the single domain condition of the sensor. In order to maintain the shape anisotropy of the sensor strip, the ratio of the width to the height should at least be greater than unity and preferably three to one or greater. This has limited the extent to which the width of the sensor can be decreased.

SUMMARY OF THE INVENTION

The subject invention is a supersensitive magnetoresistive sensor for reading high density digital magnetic recordings. The width of the magnetic read head is reduced by narrowing the width of the magnetoresistive sensor strip, thereby allowing a greater density of recording tracks which can be read on the storage medium. The improved sensor also increases sensor interaction with the recording medium by increasing the yield of the signal level from the recording medium by three times as much as using a single sensor strip in a recording head.

The novel recording head accomplishes the above results by folding the magnetoresistive sensor strip into U-shaped loops, one upon another, in a plane perpendicular to the plane of the recording medium. By folding the sensor strip, the required shape anisotropy is increased by a ratio of greater than two to one width versus height. By doing this the single domain condition of the sensor is maintained in the desired direction. The U-shaped loops of the sensor strip provide the additional advantage of increased sensor response between the sensor strip and storage medium, the improved response yielding a signal level of several times as much as a single sensor strip.

Advantages and objects of the invention will be evident from the following detailed description when read in conjunction with the accompanying drawings which illustrate an embodiment of the invention.

BRIEF DESCRIPTION OF THE DRAWINGS

FIG. 1 is a perspective view of a prior art magnetoresistive sensor for magnetic reading;

FIG. 2 is a perspective view of a supersensitive magnetoresistive sensor for high density magnetic reading;

FIG. 3 is a front view of the supersensitive magnetoresistive sensor;

FIG. 4 is the characteristic curves of the improved signal level of the supersensitive magnetoresistive sensor.

DESCRIPTION OF THE PREFERRED EMBODIMENT

In FIG. 1, the prior art magnetoresistive sensor is characterized by the general reference character 10. The sensor 10 includes a first conductor 12, second conductor 14 and a magnetoresistive sensor strip 16. The sensor 10 is positioned over a storage medium 18 and reads bits of information stored as localized magnetic fields on a recording track having a width 20. The end portions 22 and 24 of the strip 16 are connected to the end portions 26 and 28 of the conductors 12 and 14.

A sense current $I_1$ is directed through first conductor 12, sensor strip 16 and second conductor 14. Since the resistance of sensor strip 16 changes as a function of the intensity of the adjacent magnetic field, changes in current $I_1$ are detected to determine the presence or absence of a recorded localized field.

FIG. 2 illustrates the supersensitive magnetoresistive sensor characterized by the general reference character 30. In this figure, sensor strip 16 is folded into a series of U-shaped loops 32 and 34. The loops are in a plane perpendicular to the plane of the storage medium 18. The end portions 26 and 28 of strip 16 are connected to the end portions 26 and 28 of the conductors 12 and 14. By folding the strip 16 into U-shaped loops, one upon the other, the recording track width 36 is reduced in comparison to the track width 20 shown in FIG. 1. By folding the strip 16, the shaped anisotropy of the magnetoresistive sensor is increased by a ratio greater than two to one width versus height. By reducing the overall width of the sensor 30, the width of the recording track on the storage medium 18 can be reduced thereby increasing the total number of tracks that can be read on the storage medium.

FIG. 3 is a front view of the supersensitive magnetoresistive sensor 30. In this view, the U-shaped loops 32 and 34 can be seen more clearly. The loops are folded one upon another in a plane perpendicular to the plane of the recording medium 18 shown in FIG. 2. By folding the sensor strip 16 into loops, one upon the other, the interaction between the sensor strip 16 and the recording medium 18 is increased. The arm portion 38 and 40 of loop 34 and the arm portion 40 and 42 of loop 32 are substantially parallel to the plane of the storage medium 18 and the bottom portion 44 of loop 34 and the bottom portion 46 of loop 33 are substantially perpendicular to the plane of the medium 18.

FIG. 4 illustrates the increased output voltage by the looping of the sensor strip 16. Output voltage $V_1$ shows the signal level $\Delta V_1$ of the sine wave 50 using a single sensor strip as shown in FIG. 1. Output voltage $V_2$ shows the signal level $\Delta V_2$ of sine wave 52 if there were two sensor strips, one upon the other connected to the conductors. Output voltage $V_3$ illustrates the present invention wherein the sensor strip is formed into a series of loops 32 and 34 (shown in FIGS. 2 and 3) where the effect is similar to having three sensor strips, one upon the other. The signal level $\Delta V_3$ of the sine wave 54 is approximatly three times as much as that of a single sensor strip (i.e., $\Delta V_3 = 3 \Delta V_1 = (2/3) \Delta V_2$). A greater number of loops, similar to loops 32 and 34, could be formed by the sensor strip but it is recognized that the signal level would not increase proportionately to the number of loops because of the increased distance between the upper loops and the storage medium.

Changes may be made in the construction and arrangement of the parts or elements of the various embodiments as disclosed herein without departing from the spirit and scope of the invention as defined in the following claims.

I claim:

1. A read head for reading high density data recorded as discrete magnetized areas along a track of a magnetic medium, said head comprising:
   A. a magnetoresistive sensor strip including at least one open loop, said sensor strip being configured such that the arms of said loop lie completely within the effective field of each discrete magnetized area passing said sensor strip during relative motion between the latter and said magnetic medium, and electrical connecting means coupled to the ends of said sensor strip;
   B. wherein the arm of said loops are mutually superposed in parallel alignment with said medium, the dimensions of said arms being defined by a pair of planes substantially normal to said medium and spaced in the direction of relative medium motion;
   C. wherein said electrical connecting means include first and second separate parallel core portions each attached to one of said strip ends, the dimensions of said core portions in the direction of medium motion being defined by said plane; and
   D. wherein said strip is formed as a flattened S-shaped double loop comprising three parallel arms stacked between said planes, the lowest and middle arms each substantially spanning the width of said track in a direction transverse thereto, the highest arm terminating in one of said strip ends connected to said first core portion and substantially dividing said track width with the latter, said first core portion being positioned entirely above said middle arm, said lowest arm terminating in the other end of said strip connected to said second core portion, said second core portion being positioned adjacent said double loop outside said track width.

* * * * *